Patented Jan. 22, 1952

2,583,274

UNITED STATES PATENT OFFICE 2,583,274

PROCESS FOR PRODUCING MINERAL-COATED PAPER

George E. Niles, Winchester, Mass., assignor to Monsanto Chemical Company, St. Louis, Mo., a corporation of Delaware No Drawing. Application April 30, 1947, Serial No. 745,121

6 Claims. (Cl. 117—155)

This invention relates to improved mineral or pigmented coated paper, and in particular relates to paper having high brightness, high gloss and good affinity for printing inks. It involves the use of a coating composition not hitherto associated with glossy printing paper.

For the reproduction of fine half-tone cuts, an important criterion is that the surface printed upon shall be very level. Supercalendered mineral-coated paper is the stock generally employed for such printing purposes. By the term "mineral-coated paper" is meant paper comprising a fibrous base having on one or both surfaces a continuous layer of mineral or pigment composition which covers the fibers of the base and fills the hollows between the fibers on the surface of the base, so that when the paper is calendered, it has a smooth, even and continuous surface. The mineral coating composition is preferably applied to the paper in the form of an aqueous suspension. However, unless the pigment or mineral coating is suitably bonded to itself and the paper fibers, it will rub off, particularly if the coated paper surface is slightly moistened as in offset printing. It is also necessary that the coated paper has good receptivity or affinity for ink, and that the ink sets satisfactorily, that is, in a relatively short time. Commonly employed pigments are clay, calcium carbonate, blanc fixe, talc, titanium dioxide and the like.

As a pigment binder for the pigment there has been employed generally heretofore starch or casein. However, the use of either starch or casein as a pigment binder for coated paper leaves much to be desired. Thus, the use of starch provides a paper having poor water-resistance. Again, starch loses much of its binding ability on calendering of the paper. The use of starch or casein as a pigment binder presents the additional objectionable feature that the starch or casein itself varies in composition, with a resultant variation in the composition of the coated paper on which it is employed. It is also open to the objection of loss of binding ability on calendering of the paper.

By the use of the compounds of the present invention, the binding ability not only is maintained with continued calendering, but it has been discovered that less calendering of the paper is necessary where they are employed. Due to this ease of calendering there is less loss of brightness with an accompanying improvement in the quality of the paper. Likewise, since less calendering is necessary, the cost of production is less. Furthermore, since less calendering is required, cheaper grades of paper pulp can be employed in the base sheet to maintain equivalent strength.

In accordance with this invention there has been provided a new binder for pigmented or mineral-coated papers, by the application of which, paper having improved characteristics is obtained.

An object of this invention is to provide a new pigment binder for use in pigmented or mineral-coated papers.

Another object is to provide an improved coating for paper.

A further object is to provide an improved coated paper.

A further object is to provide an improved process for coating paper.

Other and further objects will be apparent as hereinafter shown.

In accordance with this invention there is employed as the binder for the pigments hereinbefore described in the paper coating composition a styrene-acrylic acid alkyl ester copolymer. More particularly, aqueous dispersions of a styrene-alkyl acrylate copolymer wherein the alkyl group has from 1 to 8 carbon atoms are preferred. Of especial utility are the ethyl and propyl acrylates. These products are conveniently prepared by copolymerizing varying amounts of the monomers according to well-known methods of the prior art. The most desirable products for use according to the present invention are obtained by copolymerizing a styrene with an alkyl acrylate wherein the alkyl group has from 1 to 8 carbon atoms and wherein the copolymer will flow readily to give a continuous film at only slightly elevated temperatures.

Generally it has been found that copolymers of this invention having a molecular weight characterized by a viscosity of 1.5 to 7.5 centipoises at 25° C. of a solution of one gram of the copolymer resin dissolved in 100 c. c. of benzene may advantageously be employed. Preferably, copolymers having a molecular weight characterized by a viscosity of 2.0 to 5.0 centipoises at 25° C. of a solution of one gram of the copolymer resin dissolved in 100 c. c. benzene as is exhibited by the resins hereinafter specifically described, are employed.

The resinous compounds so obtained are suitably incorporated together with a pigment such as clay, talc, blanc fixe and the like in a medium such as water and applied to a coating raw stock by suitable means such as, for example, by means of an air knife or roll coating coater.

As stated above, styrene-acrylate copolymers of this invention may be prepared by processes well-known to those skilled in the art. In the examples herein the copolymers of this invention were prepared according to the following procedure.

370 parts by weight of a mixture comprising 15% styrene, 83% ethyl acrylate, 2% water are placed in a suitable reactor equipped with agitator and a nitrogen inlet. There is also added 350 parts by weight of 2.2% aqueous solution of sodium lauryl sulfate solution, .04 parts by weight of $FeSO_4.9H_2O$ and 0.7 parts by weight of 30% hydrogen peroxide.

Reaction is initiated by stirring at a temperature of about 40° C. to 50° C. after sweeping out all air from the apparatus and, once started, is allowed to proceed at a steady temperature of about 30° C. At the same time there is added steadily at the rate of about 6 to 8 parts by weight per hour for 18 to 22 hours a monomer mixture of 21% ethyl acrylate, 78% styrene and 1% water together with additional emulsifying liquid, 10% sodium lauryl sulfate solution, at about 5 parts by weight per hour, the total additions consisting of 140 parts by weight of monomer and 100 parts by weight of emulsifier. About 15 hours after the start of the reaction the temperature is raised to 40° C., and, after all monomer is added, the temperature is raised to about 60° C. and the reaction mixture heated for an additional period of about 2 hours, having added additionally 0.5 parts by weight of hydrogen peroxide catalyst. If desirable there may be added, of course, an additional amount of aqueous dispersing agent such as a 12% sodium lauryl sulfate solution, depending on whether a more or less viscous dispersion is desired. The product prepared as described comprises the polymer of a mixture comprising 67% ethyl acrylate and 33% styrene.

*Example I*

100 parts by weight of domestic coating clay, 0.2 parts by weight of sodium tetra-phosphate, 12 parts by weight of styrene-ethyl acrylate copolymer prepared as described comprising the polymer of a mixture comprising 33% styrene and 67% ethyl acrylate added in the form of an aqueous dispersion were suitably admixed with sufficient water to give 66% total solids. The coating was applied to a coating raw stock by means, for example, of an air knife coater or a roll coating coater. After application, the sheet was supercalendered to such a gloss as is required by the industry. The paper so coated was dried, calendered and tested for pick by method of the "Technical Association of Pulp and Paper Industry" Standard T-459m-45 and found to be most satisfactory for printing purposes. The coating exhibited good adhesion for printing, it calendered to a high gloss with extreme ease, showed increased adhesion on calendering, showed good vehicle hold up, excellent ink receptivity and the sheet possessed superior folding qualities. The treated sheet also provided a surface with sufficient wet rub for offset lithography. By the term "wet rub" as used in the present application is meant the simple test, well-known in the paper art, where a finger is moistened and rubbed over the paper surface. If the coated surface becomes slimy, or washes off, the wet rub test demonstrates an unsatisfactory product. If the paper surface remains intact a satisfactory product is indicated. This simple test is highly effective in evaluating binders for pigmented coatings.

*Example II*

100 parts by weight of domestic clay, 0.2 parts by weight of sodium tetra-phosphate, 16 parts by weight of styrene-ethyl acrylate copolymer comprising the polymer of a mixture comprising 33% styrene and 67% ethyl acrylate, prepared as in Example I, added in the form of an aqueous dispersion were suitably admixed with sufficient water to give a coating clay stock of 64% total solids. The coating was applied to paper and tested as indicated in Example I. The coating and paper were found to possess the same good properties as that exhibited by Example I.

*Example III*

100 parts by weight of domestic clay, 0.3 parts by weight of sodium tetra-phosphate, 20 parts by weight of styrene-ethyl acrylate copolymer comprising the polymer of a mixture comprising 33% styrene and 67% ethyl acrylate, prepared as in Example I, added in the form of an aqueous dispersion were suitably admixed with sufficient water to give a coating clay stock of 63% total solids. The coating was applied to paper and tested as indicated in Example I. The coating and paper were found to possess the same desirable properties as exhibited by Example I.

*Example IV*

A copolymer comprising the polymer of a mixture comprising 60% ethyl acrylate and 40% styrene was prepared in a manner analogous to that hereinbefore described. 12 parts by weight thereof in the form of an aqueous dispersion were suitably admixed with 100 parts by weight of domestic clay, 0.2 parts by weight of sodium tetra-phosphate and sufficient water added so as to provide a coating clay stock of 66% solids. The coating was applied to paper and tested in the manner indicated in Example I. The coated paper exhibited good adhesion and wet rub.

*Example V*

A copolymer comprising the polymer of a mixture comprising 35% ethyl acrylate and 65% styrene was prepared in a manner analogous to that set forth above. 12 parts by weight thereof in the form of an aqueous dispersion were suitably admixed with 100 parts by weight of domestic clay, 0.2 parts by weight of sodium pyrophosphate and sufficient water added so as to provide a coating clay stock of 60% total solids. The coating was applied to paper and tested in the manner indicated in Example I. The coated paper exhibited satisfactory adhesion and wet rub.

*Example VI*

A copolymer comprising the polymer of a mixture comprising 50% ethyl acrylate and 50% styrene was prepared in a manner analogous to that set forth above. 12 parts by weight thereof in the form of an aqueous dispersion were suitably admixed with 100 parts by weight of domestic clay, 0.2 parts by weight of sodium tetra-phosphate and sufficient water added so as to provide a coating clay stock of 66% total solids. The coating was applied to paper and tested in the manner indicated in Example I. The coated paper exhibited satisfactory adhesion and wet rub.

In all cases the resins calendered with extreme ease requiring only about one-half of the machine effort to attain a given gloss as is required by the use of starch and casein coated sheets. Moreover, the coating formulas have a quite low viscosity at high solids content, which is desired by machine coaters.

Instead of ethyl acrylate, other alkyl acrylate such as methyl, propyl, butyl, amyl, hexyl, heptyl and octyl acrylates are copolymerized with styrene and its derivatives such as methyl styrene and the like characterized as styrenes, and employed as pigment binders according to the present invention.

Of course, other ratios of the copolymers of this invention than those specifically shown may be employed. Thus, 8 and 10 parts of resin per 100 parts of clay have been advantageously employed. Generally from about 4% to 30% on the weight of the mineral or pigment may be conveniently used.

The examples set forth herein are to be understood as illustrative and not limitative of the scope of the present invention.

What is claimed is:

1. The process of producing a mineral-coated printing paper of high brightness and having excellent ink receptivity which consists in coating at least one side of a paper body stock with an aqueous slurry consisting essentially of water, a pigment and from 4 to 30% by weight based on said pigment of a binder consisting of a copolymer of from 33 to 65% by weight of styrene and from 67 to 35% by weight of an alkyl acrylate, said copolymer being dispersed in said slurry and being the sole binder for said pigment, and then drying and calendering the coated paper stock.

2. The process of producing a mineral-coated printing paper of high brightness and having excellent ink receptivity which consists in coating at least one side of a paper body stock with an aqueous slurry consisting essentially of water, a pigment and from 4 to 30% by weight based on said pigment of a binder consisting of a copolymer of from 33 to 65% by weight of styrene and from 67 to 35% by weight of an alkyl acrylate, in which the alkyl group has less than nine carbon atoms, said copolymer being dispersed in said slurry and being the sole binder for said pigment, and then drying and calendering the coated paper stock.

3. The process of producing a mineral-coated printing paper of high brightness and having excellent ink receptivity which comprises coating at least one side of a paper body stock with an aqueous slurry consisting essentially of water, a pigment and from 4 to 30% by weight based on the pigment of a binder consisting of a copolymer of 33 to 65% by weight of styrene and from 67 to 35% by weight of ethyl acrylate, said copolymer being dispersed in said slurry and being the sole binder for said pigment, and then drying and calendering the coated paper stock.

4. The process of producing a mineral-coated printing paper of high brightness and having excellent ink receptivity which comprises coating at least one side of a paper body stock with an aqueous slurry consisting essentially of water, a pigment and from 4 to 30% by weight, based on said pigment, of a binder consisting of a copolymer of 33 to 65% by weight of styrene and from 67 to 35% by weight of methyl acrylate, said copolymer being dispersed in said slurry and being the sole binder for said pigment, and then drying and calendering the coated paper stock.

5. The process of producing a mineral-coated printing paper of high brightness and having excellent ink receptivity which comprises coating at least one side of a paper body stock with an aqueous slurry consisting essentially of water, a pigment and from 4 to 30% by weight, based on the pigment, of a binder consisting of a copolymer of from 33 to 65% by weight of styrene and from 67 to 35% by weight of butyl acrylate, said copolymer being dispersed in said slurry and being the sole binder for said pigment, and then drying and calendering the coated paper stock.

6. The process of producing a mineral-coated printing paper of high brightness and having excellent ink receptivity which comprises coating at least one side of a paper body stock with an aqueous slurry consisting essentially of water, a mineral pigment and from 4 to 30% by weight, based on the pigment, of a binder consisting of a copolymer of from 33 to 65% by weight of styrene and from 67 to 35% by weight of ethyl acrylate, said slurry containing about 60 to 66% by weight of solids and having said copolymer dispersed therein, said binder being the sole binder for said pigment, and then drying and calendering the coated paper stock.

GEORGE E. NILES.

REFERENCES CITED

The following references are of record in the file of this patent:

UNITED STATES PATENTS

| Number | Name | Date |
|---|---|---|
| 1,976,679 | Fikentscher et al. | Oct. 9, 1934 |
| 1,982,018 | Owen | Nov. 27, 1934 |
| 2,125,527 | Tyce et al. | Aug. 2, 1938 |
| 2,140,048 | Fikentscher et al. | Dec. 13, 1938 |
| 2,287,348 | Hayden, Jr. | June 23, 1942 |
| 2,370,057 | Mack | Feb. 20, 1945 |
| 2,414,313 | Leek | Jan. 14, 1947 |

FOREIGN PATENTS

| Number | Country | Date |
|---|---|---|
| 371,396 | Great Britain | Apr. 14, 1932 |
| 387,736 | Great Britain | Feb. 16, 1933 |
| 436,084 | Great Britain | Sept. 30, 1935 |
| 478,309 | Great Britain | Jan. 13, 1938 |

OTHER REFERENCES

Ser. No. 397,138, Fikentscher et al. (A. P. C.), published May 11, 1943.